US011083064B2

(12) United States Patent
Temporao et al.

(10) Patent No.: US 11,083,064 B2
(45) Date of Patent: Aug. 3, 2021

(54) LED BULB ADAPTERS AND METHODS OF RETROFITTING LED BULBS

(71) Applicant: INTELLIGENT LIGHTING TECHNOLOGIES INC., Sault Ste Marie (CA)

(72) Inventors: Jose Temporao, Sault Ste Marie (CA); David Byron, Sault Ste Marie (CA)

(73) Assignee: INTELLIGENT LIGHTING TECHNOLOGIES INC., Sault Ste. Marie (CA)

( * ) Notice: Subject to any disclaimer, the term of this patent is extended or adjusted under 35 U.S.C. 154(b) by 0 days.

(21) Appl. No.: 16/709,384

(22) Filed: Dec. 10, 2019

(65) Prior Publication Data

US 2020/0109823 A1    Apr. 9, 2020

Related U.S. Application Data

(63) Continuation of application No. 15/526,141, filed as application No. PCT/IB2015/058719 on Nov. 11, 2015, now Pat. No. 10,527,232.
(Continued)

(51) Int. Cl.
*F21S 8/04* (2006.01)
*F21V 23/06* (2006.01)
(Continued)

(52) U.S. Cl.
CPC ......... *H05B 45/3578* (2020.01); *F21K 9/232* (2016.08); *F21K 9/237* (2016.08);
(Continued)

(58) Field of Classification Search
CPC ... Y02B 20/386; F21Y 2115/10; F21K 9/232; F21K 9/237; F21S 8/043
See application file for complete search history.

(56) References Cited

U.S. PATENT DOCUMENTS

| 5,207,504 A | 5/1993 | Swift | F21S 8/04 362/147 |
| 7,507,001 B2 | 3/2009 | Kit | |

(Continued)

FOREIGN PATENT DOCUMENTS

CN    202647489 U    1/2003

OTHER PUBLICATIONS

Form PTO-892 filed in related U.S. Appl. No. 15/526,141, filed May 2, 2019.
(Continued)

*Primary Examiner* — Karabi Guharay
(74) *Attorney, Agent, or Firm* — Norton Rose Fulbright Canada LLP

(57) ABSTRACT

A method of retrofitting a plurality of LED bulbs to a fluorescent tube fixture with a ballast, a fluorescent tube receptacle, a reflector housing and a lens comprises: removing the lens from the reflector housing; disconnecting the ballast from a mains power supply line and removing the ballast and the fluorescent tube receptacle from the housing. The mains mains power supply is wired to a plurality of Edison socket light-emitting diode (LED) bulb sockets extending from a body defining an electrical junction box and threading a plurality of LED bulbs into the bulb sockets. The electrical junction box is mounted to the reflector housing. The fixture lens is reinstalled to the housing such that the bulb adapter is received in an enclosure defined by the housing and the lens.

20 Claims, 21 Drawing Sheets

Related U.S. Application Data

(60) Provisional application No. 62/078,161, filed on Nov. 11, 2014.

(51) Int. Cl.
    *H05B 45/3578*     (2020.01)
    *H02G 3/20*     (2006.01)
    *F21K 9/232*     (2016.01)
    *F21K 9/237*     (2016.01)
    *F21Y 115/10*     (2016.01)

(52) U.S. Cl.
CPC ............... *F21S 8/04* (2013.01); *F21S 8/043* (2013.01); *F21S 8/046* (2013.01); *F21V 23/06* (2013.01); *H02G 3/20* (2013.01); *F21Y 2115/10* (2016.08); *Y02B 20/30* (2013.01)

(56) References Cited

U.S. PATENT DOCUMENTS

| | | | |
|---|---|---|---|
| 10,527,232 B2 * | 1/2020 | Temporao | F21K 9/237 |
| 2006/0018116 A1 | 1/2006 | Plunk | F21S 8/031 362/217.16 |
| 2007/0195527 A1 | 8/2007 | Russell | |
| 2012/0155073 A1 | 6/2012 | McCanless | F21S 8/04 362/218 |
| 2012/0161666 A1 | 6/2012 | Antony et al. | |
| 2013/0039074 A1 | 2/2013 | Ding | F21S 8/04 362/311.01 |
| 2014/0328066 A1 | 11/2014 | Barnetson et al. | |
| 2015/0233533 A1 | 8/2015 | Van Es | F21S 4/28 313/49 |
| 2016/0091148 A1 | 3/2016 | Leung | F21S 8/026 362/222 |

OTHER PUBLICATIONS

Form PTO-892 filed in related U.S. Appl. No. 15/526,141, filed Nov. 23, 2018.
Form PTO/SB/08a filed in related U.S. Appl. No. 15/526,141, filed Nov. 23, 2018.
Form PTO/SB/08a filed in related U.S. Appl. No. 15/526,141, filed May 11, 2017.
PCT International Search Report and Written Opinion dated Dec. 3, 2015 RE International Patent Application No. PCT/IB2015/058719.
Machine Translation of Patent No. CN 202647489U dated Dec. 2, 2015.

\* cited by examiner

LED BULB ADAPTERS AND METHODS OF RETROFITTING LED BULBS

CROSS-REFERENCE TO RELATED APPLICATIONS

This application is a continuation of U.S. patent application Ser. No. 15/526,141, filed May 11, 2017, which claims priority to International (PCT) Patent Application No. PCT/IB2015/058719, filed Nov. 11, 2015, which claims priority from U.S. Provisional Patent Application No. 62/078,161, filed on Nov. 11, 2014, the entire contents of which are incorporated herein by reference.

FIELD

The improvements generally relate to the field of lighting fixtures, and in particular, to LED lighting fixtures.

BACKGROUND

Fluorescent light fixtures are ubiquitous in many applications, such as industrial, commercial and residential buildings, vessels, and the like. Some building technologies are designed around fluorescent light fixtures. For example, some types of suspended ceilings are designed to accommodate fluorescent fixtures of certain standard sizes.

Typical fluorescent light fixtures include a housing and a ballast circuit, adapted to receive standard mains power such as North American standard 120V/60 Hz AC power, 347V AC power or 277V AC power, as input, and produce suitable output power for driving fluorescent tubes.

Advances in the lighting industry have led to wide availability of many types of lightbulbs, including traditional incandescent and fluorescent bulbs, as well as light-emitting diode (LED) bulbs.

LEDs typically provide certain advantages over traditional fluorescent lights. For example, LED lights are typically much more energy efficient and have a longer service life relative to fluorescent and incandescent lights.

Such lights require appropriate fixtures in which to be installed. Unfortunately, some common existing fixture types, such as fluorescent tube fixtures, are not suitable for most LED lights. For example, power delivered fluorescent tube fixtures may not be compatible with most LED lights, and such lights may not produce desirable light distribution with existing fixtures. Accordingly, retrofitting may be required to take advantage of existing installations.

SUMMARY

Disclosed herein is a method of retrofitting a plurality of LED bulbs configured for removable connection to an Edison socket bulb receptacle, to a fluorescent tube fixture having a ballast, a fluorescent tube receptacle for receiving pins of a fluorescent tube, and an enclosure defined by a reflector housing and a lens. The method comprises: removing the lens from the reflector housing; disconnecting the ballast from a mains power supply line and removing the ballast and the fluorescent tube receptacle from the housing; wiring the mains power supply line to a plurality of Edison socket light-emitting diode (LED) bulb sockets extending from a body defining an electrical junction box, the bulb sockets configured to distribute light from the LED bulbs across the lens and the reflector; threading a plurality of LED bulbs into the bulb sockets; mounting the electrical junction box to the reflector housing; installing the lens to the housing such that the bulb adapter is received in an enclosure defined by the housing and the lens.

Also disclosed herein is a bulb adapter for retrofitting light-emitting diode (LED) bulbs to a fluorescent tube fixture having a ballast and an enclosure defined by a reflective housing and a lens, the bulb adapter comprising: a body defining an electrical junction box; a plurality of LED bulb sockets extending in different directions from the body to hold LED bulbs in a generally planar arrangement inside the enclosure; a mounting flange defining an opening in the body for receiving a mains power supply line to connect the mains power supply line to the LED bulb sockets, the mounting flange for securing the body to the housing so that the LED bulbs distribute light across the reflective housing and the lens.

Many further features and combinations thereof concerning embodiments described herein will appear to those skilled in the art following a reading of the instant disclosure.

DESCRIPTION OF THE FIGURES

In the figures which illustrate example embodiments.

DETAILED DESCRIPTION

Figure 1:
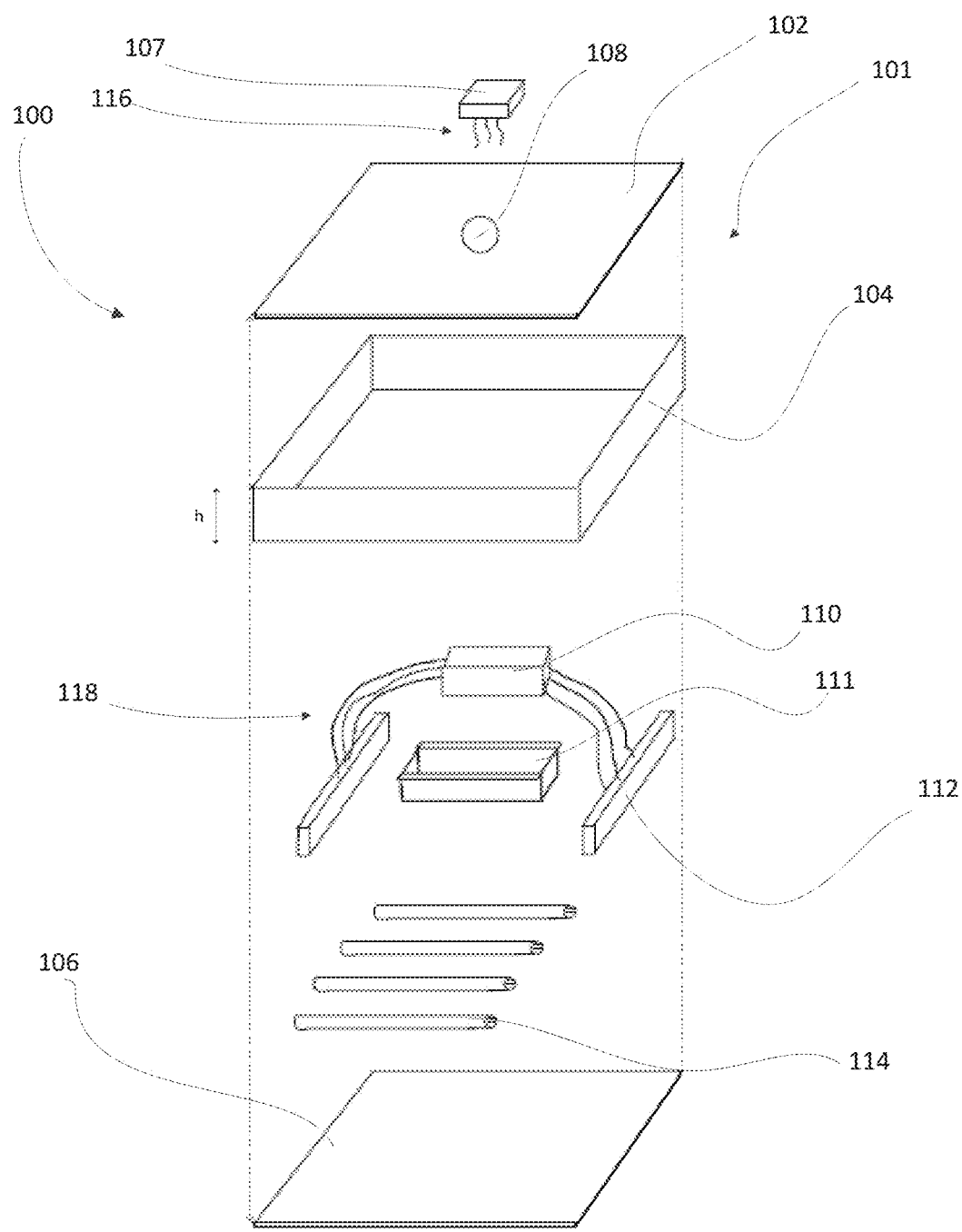
FIG. 1 is an exploded view of a flourescent light fixture with tubes.

FIG. 1 is an exploded view of an example fluorescent light fixture 100 which may, for example, be installed in a commercial or residential building.

Fluorescent light fixture 100 includes an enclosure defined by a housing 101 and a lens 106. Housing 101 includes a top plate 102 and a plurality of walls 104. Each of top plate 102 and walls 104 has a reflective internal surface. Lens 106 is mounted to housing 101 opposite top plate 102. Lens 106 may, for example, be hinged or clipped to walls 104. Lens 106 may be transparent or translucent to scatter light. Housing 101 may be mounted to a ceiling such as a suspended ceiling (not shown). For example, housing 101 may be received in a recess in a ceiling. Top plate 102 has a hole 108 to receive wiring for driving light fixture 100. Hole 108 may be aligned with a junction box 107.

Fluorescent light fixture 100 may be sized to receive fluorescent tubes of a standard length, and in turn, to be received in a lighting recess of a standard size in a wall or ceiling. For example, fluorescent light fixture 100 may be sized to receive tubes 2, 3, 4 or 8 feet in length, and to be received in a 2 foot by 2 foot, 2 foot by 4 foot, 1 foot by 4 foot, 1 foot by 8 foot, 2 foot by 8 foot or 2 foot by 4 foot recess. Fluorescent fixture 100 may also be surface mounted rather than mounted in a recess. Fluorescent tubes may be cylindrical, as depicted. Alternatively, fluorescent tubes may be U-shaped or circular.

Housing 101 of fluorescent light fixture 100 may have a height h defined by walls 104. Height h may be sufficient to so that internal components of light fixture 100 may be fully enclosed between housing 101 and lens 106. In an example, height h may be 3.5 inches. In other embodiments, height h may be more or less than 3.5 inches.

Fluorescent light fixture 100 has a ballast 110 and a plurality of fluorescent tube holders 112. Fluorescent tubes 114 may be installed in light fixture 100 by mounting in tube holders 112. Though light fixture 100 has a single ballast 110, other fixtures may have multiple ballasts, as will be apparent to skilled persons.

Fluorescent tubes 114 may for example be standard mercury-vapor lamps with single-pin or bi-pin connnectors, such as T12, T8 or T5 lamps. In some embodiments, 114 may be rated for wattage of approximately 30-55 watts each. As depicted, four fluorescent tubes 114 are installed in fixture 100. However, in other embodiments, more or fewer tubes may be present.

Tubes 114 are elongate, and may for example be approximately 4 feet long and 1-2 inches in diameter. Accordingly, as will be apparent, tubes 114 distribute light throughout housing 101 and lens 106. The elongate shape of tubes 114, combined with the reflectivity of the inner surfaces of housing 101 and translucency of lens 106 scatters light emanating from fixture 100 so that a desirable lighting pattern is achieved.

Ballast 110 is wired to mains power, e.g. North American 120V/60 Hz AC household power, or 347V AC power through mains power supply lines 116. Ballast 110 is wired to tubes 114 through tube holders 112 and ballast output lines 118. Ballast 110 is enclosed within a ballast cover 111 for safety reasons.

As is well known to skilled persons, ballast 110 converts and conditions ballast input power to safely drive tubes 114. For example, ballast 110 provides a start-up voltage to turn on tubes 114 and limits voltage and current through tubes 114 during operation. Tubes 114 typically have contact pins, which creates a relatively high risk of inadvertent short circuit during installation or removal of tubes 114. The fluctuating voltage delivered by ballast 110 increases the danger associated with such short-circuits and overheating. Safety regulations typically require that lines carrying mains power (e.g. 120V or 347V) be enclosed within ballast cover 111.

Ballast 110 typically consumes power during operation. In an example, a ballast 110 for driving T8 fluorescent tubes may consume on the order of 10 W and a ballast 110 for driving T12 fluorescent tubes may consume on the order of 20 W.

LED lamps may be more efficient than typical fluorescent lamps. For example, some LED lamps may consume on the order of 70% less power than fluorescent lamps to produce a corresponding amount of light.

It may therefore be desired to use LED tube lamps with fluorescent light fixture 100. However, electrical characteristics of typical LED tubes differ from those of typical fluorescent tubes. For example, LEDs typically require DC power and different voltage than that required by fluorescent tubes. Thus, use of LED tubes with fixture 100 would require a specific LED driver instead of or in addition to ballast 110. Such drivers are costly and tend to frequently need replacement.

Figure 2:
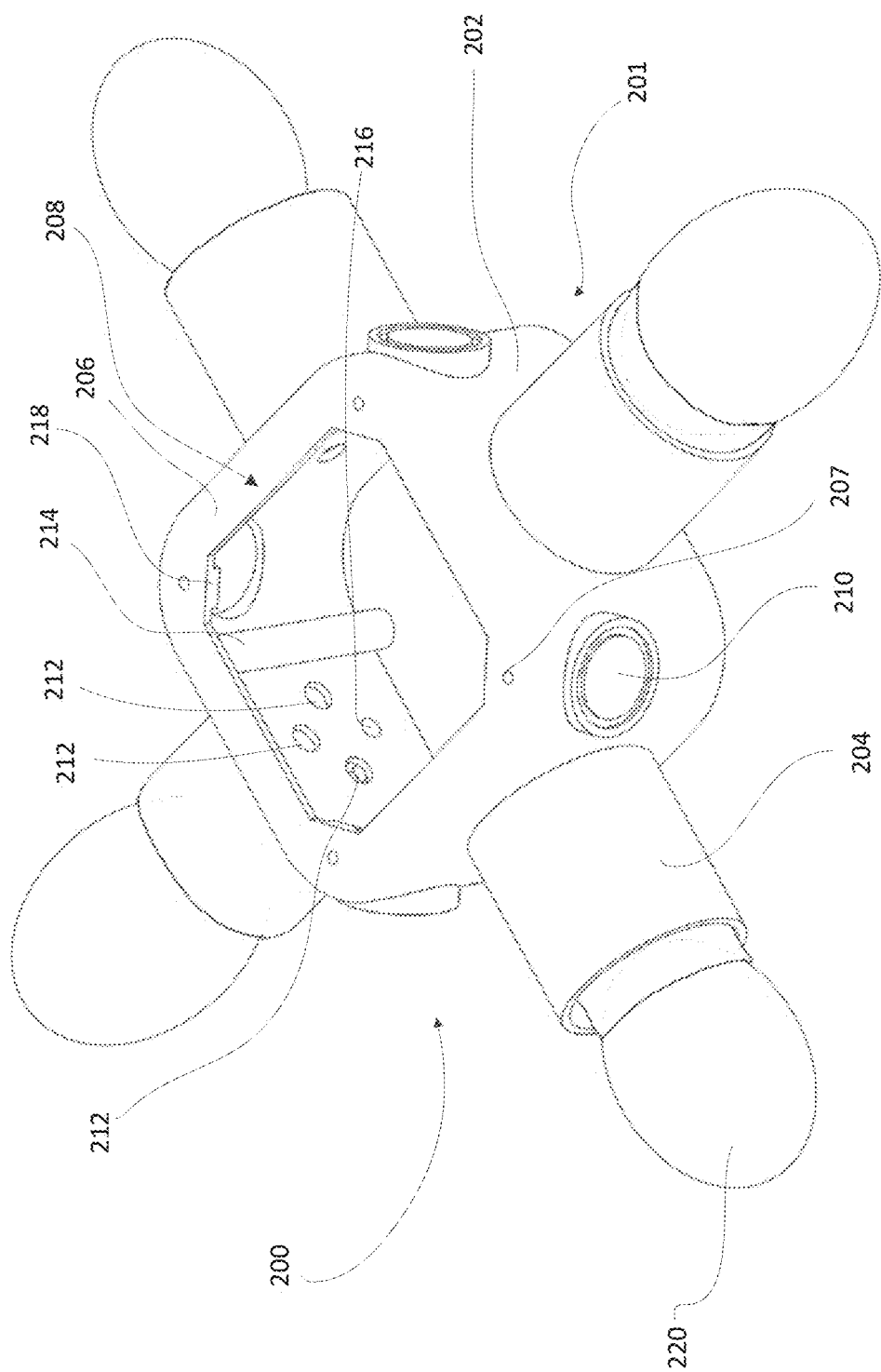
FIG. 2 is a perspective view of a LED bulb adapter with bulbs.

FIG. 2 depicts a perspective view of a lighting assembly 200 configured for retrofitting to fixture 100. Lighting assembly 200 includes a LED bulb adapter 201 and a plurality of high-efficiency bulbs, such as LED bulbs 220. Lighting assembly 200 allows for the elimination of ballast 110 or a separate LED driver and permits safe installation, operation and removal of bulbs. Typically, LED bulbs 220 are rated for 25 W or less. LED bulbs 220 may produce more light per unit wattage than incandescent or fluorescent lamps. Using relatively low-wattage LED bulbs (e.g. <25 W) may limit risk of overheating issues. Suitable bulbs are available from numerous manufacturers, such as Philips, GE, Sylvania and Cree.

LED bulb adapter 201 has an electrical enclosure 202 and a plurality of bulb arms 204 which extend away from electrical enclosure 202. As depicted, electrical enclosure 202 is an electrical junction box, which may be configured and approved to safely house connections between wires carrying mains (e.g. household 120V AC) power. Electrical enclosure 202 is generally rectangular, with four lateral side walls and a top side having a mounting flange 206 defining a central opening 208. However, other shapes are possible.

Figure 3:
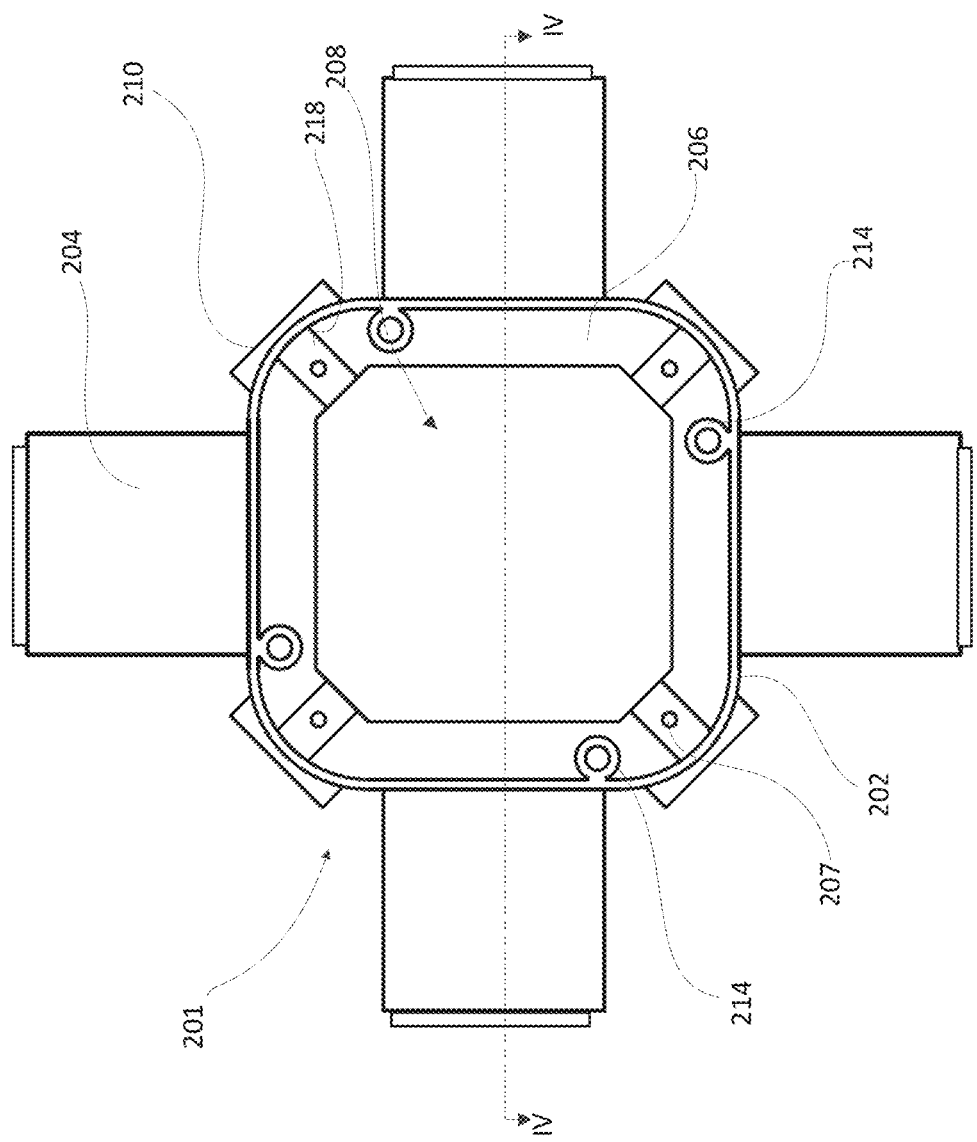
FIG. 3 is a bottom view of the LED bulb adapter of FIG. 2.
Figure 4:
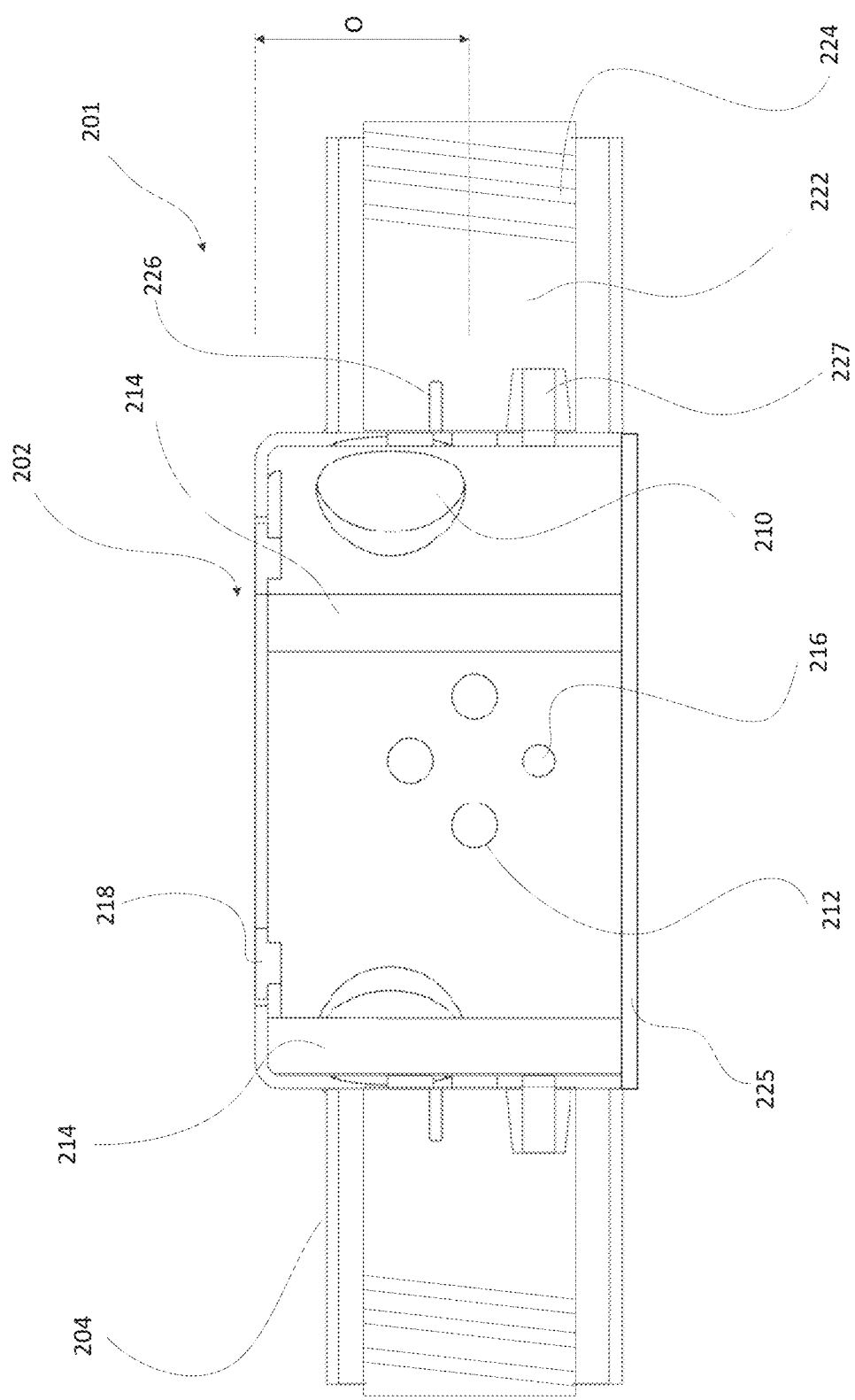
FIG. 4 is a cross-sectional view of the LED bulb adapter of FIG. 3 along line IV-IV shown in FIG. 3.

Bulb arms 204 extend in different directions away from electrical enclosure 202. As depicted in FIGS. 2-4, LED bulb adapter has four bulb arms 204, one extending from each lateral side of the electrical enclosure 202. Bulb arms 204 may be integrally formed with electrical enclosure 202, or may be attached thereto.

In an example, electrical enclosure 202 and bulb arms 204 may be formed from a non-flammable and electrically non-conductive material, such as polyvinyl chloride according to Ontario Provincial Standard Specification OPSS 2492. Other suitable materials will be apparent to skilled persons.

In some embodiments, LED bulb adapter 201 may be safety certified for use as an electrical junction box. For example, LED bulb adapter 201 may carry a certification by UL LLC.

Bulb arms 204 include metallic bulb sockets 222. Bulb sockets 222 have internal threads 224 for receiving and releasably retaining bulbs 220. Bulb sockets 222 electrically engage bulbs 220. Bulb sockets 222 may be standard Edison sockets, such as ANSI or IEC specified standard screw-type sockets. Such sockets are commonly used for incandescent bulbs. In an example, bulb sockets 222 may be configured to receive bulbs having a standard E26 medium base. Alternatively, bulb sockets 222 may be configured to receive bulbs with other standard or non-standard bases. Edison-socket LED bulbs are widely available in many sizes, shapes, wattage ratings, colours, and other variations. Such LED bulbs typically include integrated drivers within the bulb housings for converting mains (e.g. 120V AC) power to DC power for driving LEDs.

Bulb sockets 222 may be secured to electrical enclosure 202 by fasteners 216. Fasteners 216 may be screws or any other suitable fasteners. Fasteners 216 may be received in and engage sockets 227 defined in bulb sockets 222 (see FIG. 4). Bulb sockets 222 may also have a plurality of terminals 226 for receiving electrical power. As depicted, bulb sockets 222 have terminals 226 for connection to positive and negative leads.

Electrical enclosure 202 has a plurality of holes 212 through which wires 209 may be passed for connection to terminals 226. Electrical enclosure 202 may be positioned with central opening 208 abutting an electrical connector such as a junction box, and leads from the electrical junction box may be received through central opening 208 and joined to leads connected with terminals 226 through openings 212. Thus, electrical enclosure 202 may be mounted within a fixture, defining an electrical box within the fixture abutting and extending another electrical box outside the fixture. This is contrary to typical light fixture arrangements, in which the mains connections are enclosed outside the fixture.

Electrical enclosure 202 is also equipped with a plurality of knock-out panels 210. Knock-out panels 210 are defined by regions of decreased wall thickness and can be removed from electrical enclosure 202 by manual application of pressure to create windows allowing wires to be passed through.

For example, wiring of some fluorescent fixtures may require mains power supply lines 116 to be routed other than through a central hole 108 in top panel 102. In such embodiments, power supply wires may be routed to a knock-out rather than through top opening 208. A standard electrical connector may be mounted at the knock out to allow for a safe connection, e.g. ½ inch metal or plastic connectors, as are commonly available.

In an example, an extension ring may be fitted over a junction box, and a cable (e.g. a mechanically protected or armored cable) may be run from the junction box to an electrical connector in a knock-out. Such an arrangement may be referred to as a "whip" and may permit LED bulb adapter 201 to be placed at any location relative to the junction box.

A plurality of sleeves 214 are defined on the interior of body 214. Sleeves 214 can receive fasteners, e.g. screws, to secure a bottom panel 225 to electrical enclosure 202. For the sake of illustration, bottom panel 225 is omitted from FIGS. 3 and 5.

A plurality of mounting holes 207 may be formed in flange 206. Mounting holes may receive screws or other suitable fasteners for attaching electrical enclosure 202 to a fixture housing, wall or ceiling. In some embodiments, electrical enclosure 202 may be attached using self-tapping screws. Use of such screws may avoid the need to align mounting holes 207 with pilot holes in fixture 100. Mounting holes 207 may be reinforced by tabs 218, formed as regions of flange 206 with increased thickness. When mounted, mounting flange 206 may tightly abut the surface to which LED bulb adapter 201 is attached, namely, top panel 102 of fixture 100, a wall, a ceiling or the like.

Figure 5:
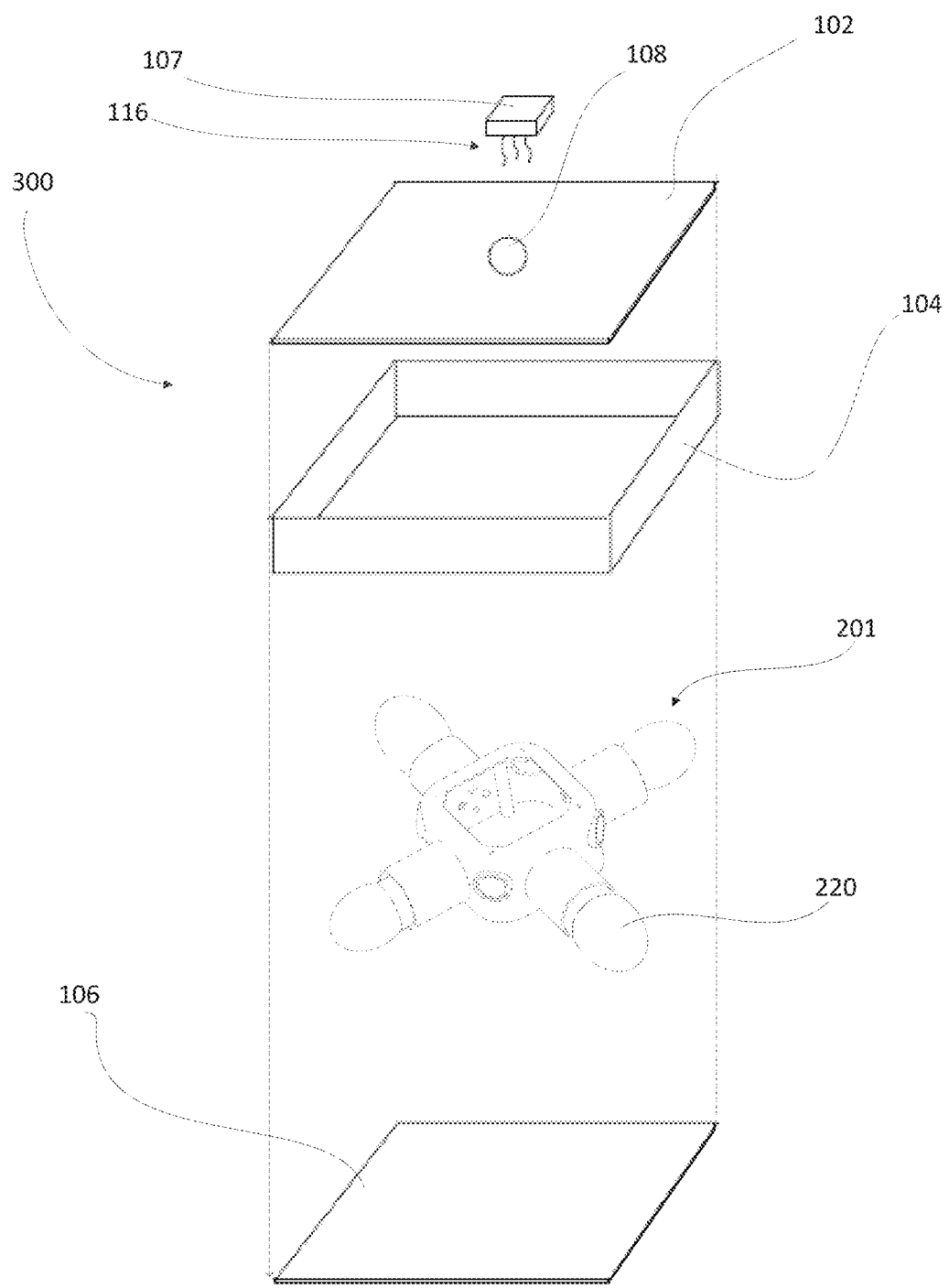
FIG. 5 is an exploded view of a light fixture including the LED bulb adapter and bulbs of FIG. 2.

LED bulb adapter 201 may be used to retrofit fixture 100 to use LED bulbs. FIG. 5 depicts an exploded view of a fixture 300, similar to fixture 100 except that ballast 110, ballast holder 111, tube holder 112 and fluorescent tubes 114 have been replaced with LED bulb adapter 201 and LED bulbs 220. Like components of fixtures 100, 300 are identified with like numerals.

Mains power supply lines 116 are routed through opening 208 of electrical enclosure 202 and connected with bulb sockets 222 through holes 212. Conveniently, LED bulb adapter 201 encloses mains power supply lines 116 to protect against shock hazards due to the voltage of mains power supply lines 116.

As will be apparent from FIG. 5, LED bulb adapter 201 holds LED bulbs 220 so that light emitted by LED bulbs 220 is distributed across housing 101 and lens 106 of fixture 300. That is, bulb arms 204 extend in different directions such that one LED bulb 220 is held proximate each corner of housing 101. Thus, light is distributed across the inner surface of housing 101 and reflected toward lens 106, which further scatters light exiting the fixture. Accordingly, LED bulb adapter 201 may cooperate with housing 101 and lens 106 to achieve light distribution similar to that provided by fluorescent tubes 114.

Moreover, while LED bulb adapter holds LED bulbs 220 to cooperate with housing 101 and lens 106 for effective light distribution, the substantially planar configuration of bulb arms 204 limits the height of LED bulb adapter 201 and the associated bulbs 220, such that they fit entirely within the enclosure defined by housing 101 and lens 106.

Bulb arms 204 may be offset from mounting flange 206 to provide spacing of bulbs 220 from the surface to which LED bulb adapter 201 is mounted. Such spacing may be selected to ensure clearance of certain types of LED bulbs 220, to ensure that such bulbs fit within the enclosure defined by housing 101 and lens 106 of fixture 100, and to provide a desired light distribution. In an example, an offset O between the top of mounting flange 206 and the midline of bulb arms 204 may be approximately 1 3/16 inches.

In an example, each side of electrical enclosure 202 may be approximately 4 inches long and electrical enclosure 202 may be approximately 2 4/16 inch thick. Bulb sockets 204 may extend approximately 1 3/4 inch from electrical enclosure 202 and top opening 208 may be approximately 3 inches by 3 inches. The inventors have determined that such dimensions ensure acceptable distribution of light and provide for flexibility of installation.

LED bulb adapter 201 depicted in FIGS. 2-4 has four bulb arms 204 for receiving four LED bulbs. Other configurations are also possible.

Figure 6:
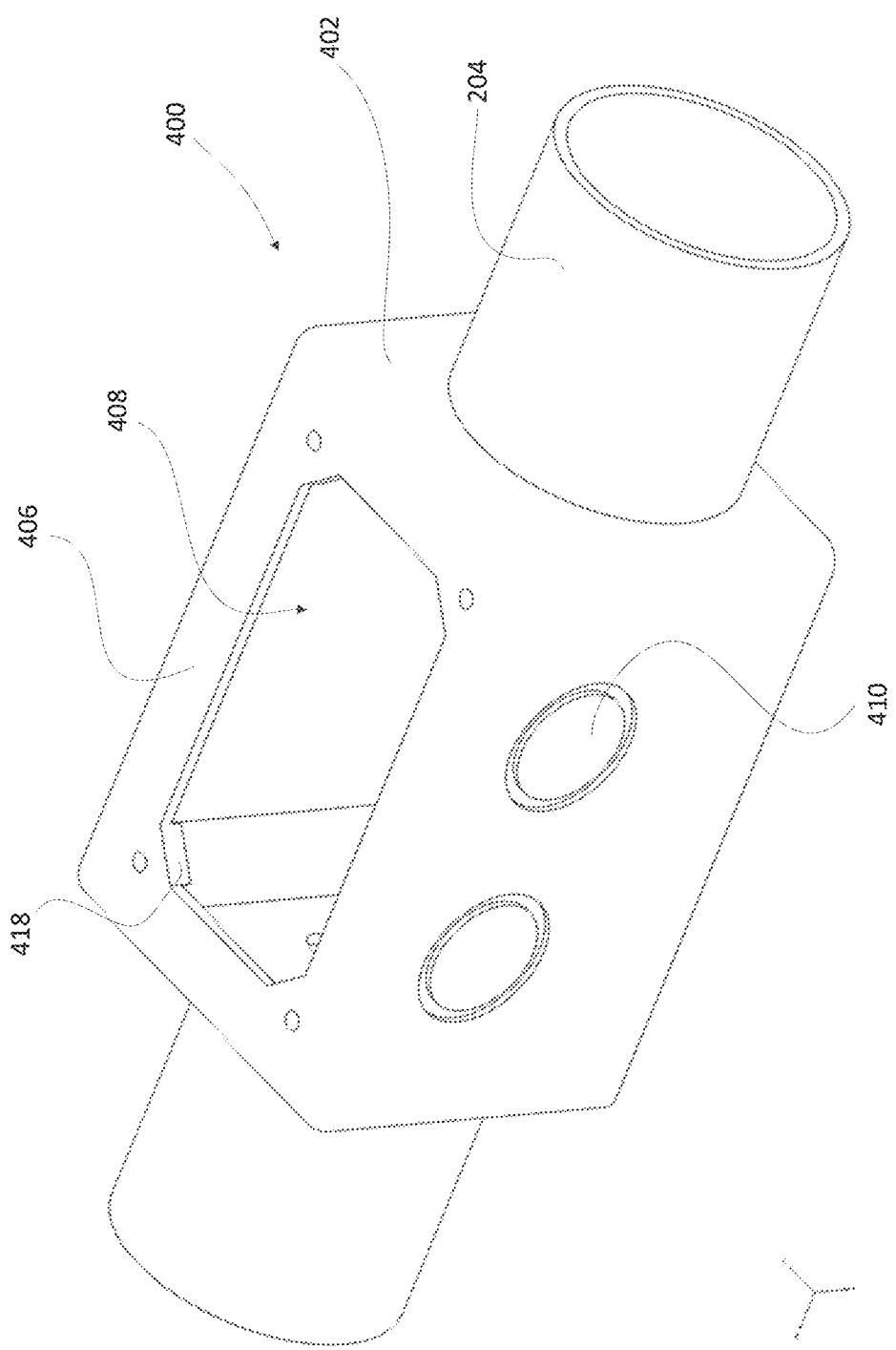
FIG. 6 is a perspective view of another LED bulb adapter.
Figure 7:
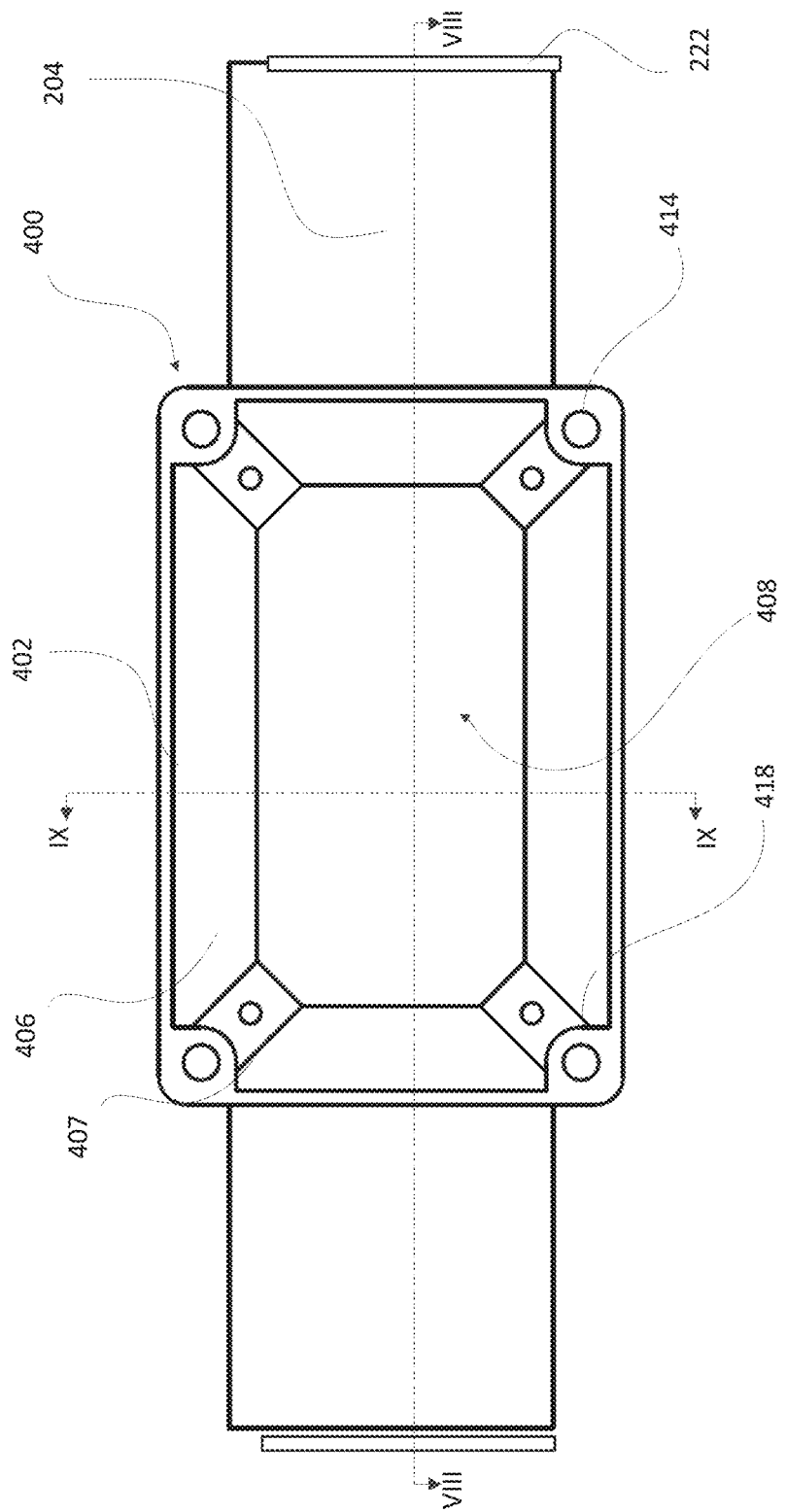
FIG. 7 is a bottom view of the LED bulb adapter of FIG. 6.
Figure 8:
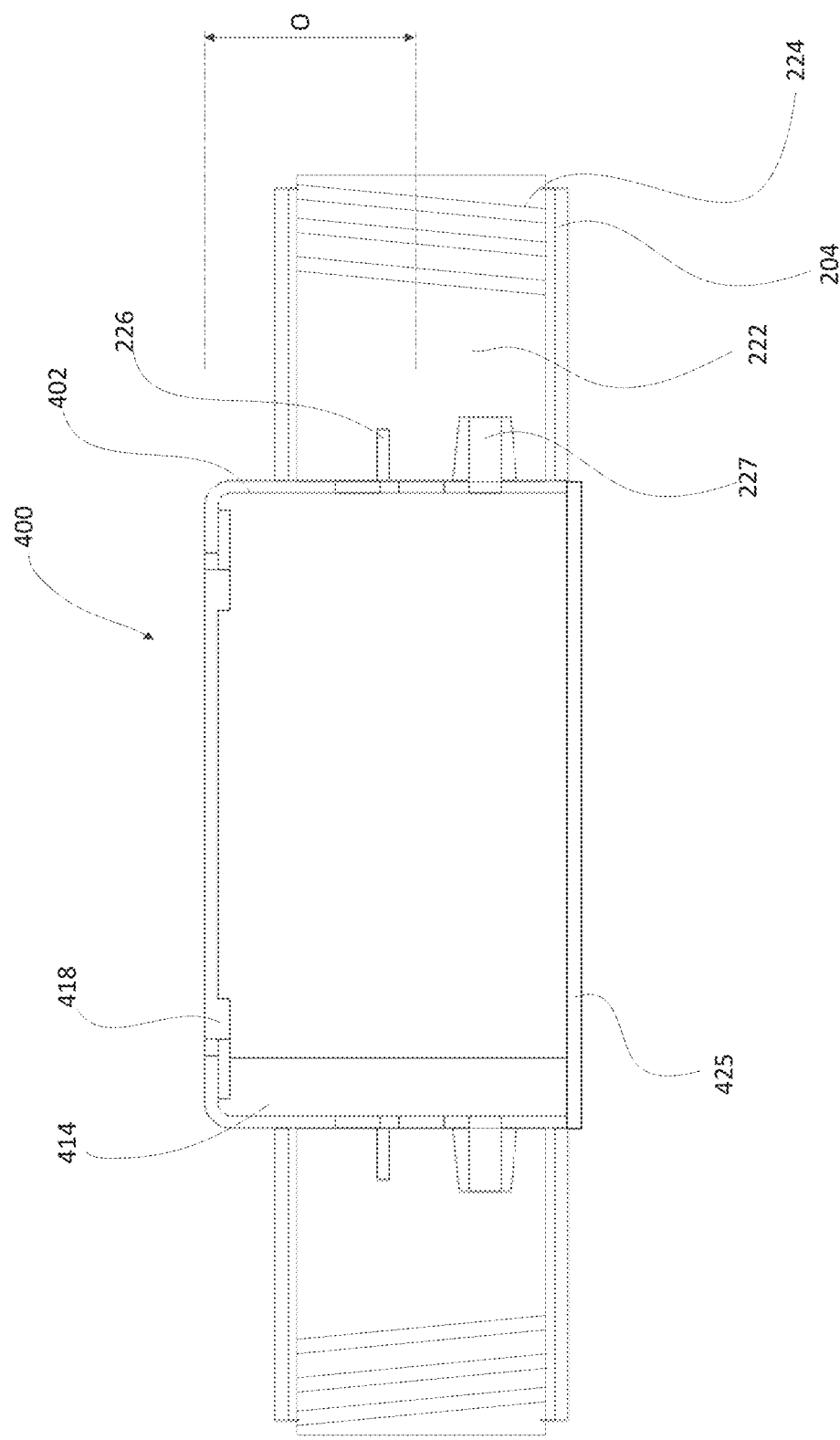
FIG. 8 is a cross-sectional view of the LED bulb adapter of FIG. 6 along line VIII-VIII shown in FIG. 7.
Figure 9:
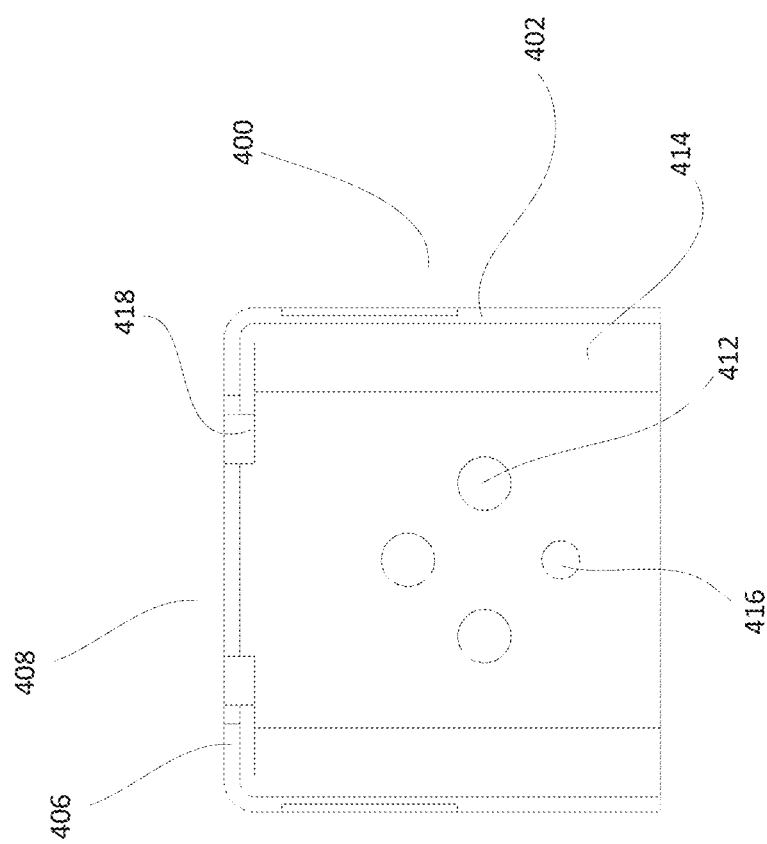
FIG. 9 is a cross-sectional view of the LED bulb adapter of FIG. 6 along line IX-IX shown in FIG. 7.

For example, FIGS. 6-7 depict perspective and bottom views, respectively, of a LED bulb adapter 401 having two bulb arms 204 to receive two LED bulbs.

Bulb arms 204 of LED bulb adapter 401 are identical to bulb arms 204 of LED bulb adapter 201.

LED bulb adapter 401 has an electrical enclosure 402, generally similar to electrical enclosure 202 of LED bulb adapter 201, but with a narrower rectangular shape. Bulb arms 204 of LED bulb adapter 401 extend from opposing ends of electrical enclosure 402 to hold bulbs in a generally planar arrangement.

LED bulb adapter 401 is configured for installation to a fluorescent fixture designed to hold two bulbs. In an example, electrical enclosure 402 of LED bulb adapter 401 is suited for installation to a fixture 1 foot by 4 feet, 1 foot by 8 feet, 2 feet by 2 feet, 2 feet by 4 feet or 2 feet by 8 feet.

Electrical enclosure 402 has a mounting flange 406 defining a top opening 408 for receiving mains power supply lines 116 (FIG. 1). Flange 406 has a plurality of mounting holes 407 for receiving fasteners such as screws for fixing electrical enclosure 402 to a fixture, ceiling or wall. Mounting holes are reinforced by tabs 418 formed on flange 406, having increased wall thickness.

Opening 408 is sufficiently large to provide significant clearance for passing mains power supply lines 116 into electrical enclosure 402. Such clearance may provide ease and flexibility of installation, as electrical enclosure 402 need not be precisely aligned.

Electrical enclosure 402 has holes 412 for routing of wires 409 to terminals 224 of bulb arms 204. In addition, electrical enclosure 402 has a plurality of knock-out panels 410 defined by regions of decreased wall thickness, substantially similar to knock-out panels 210.

In an example, LED bulb adapter 401 may have an offset O between mounting flange 406 and the midline of bulb arms 204 of approximately 1 3/16 inches. Electrical enclosure 402 may be approximately 2 1/4 inches wide and 4 inches long and approximately 2 4/16 inches thick (thickness refers to the dimension from mounting flange 206 to bottom panel 225). Top opening 408 may be approximately 3 inches long by 1 1/2 inches wide.

Figure 10:
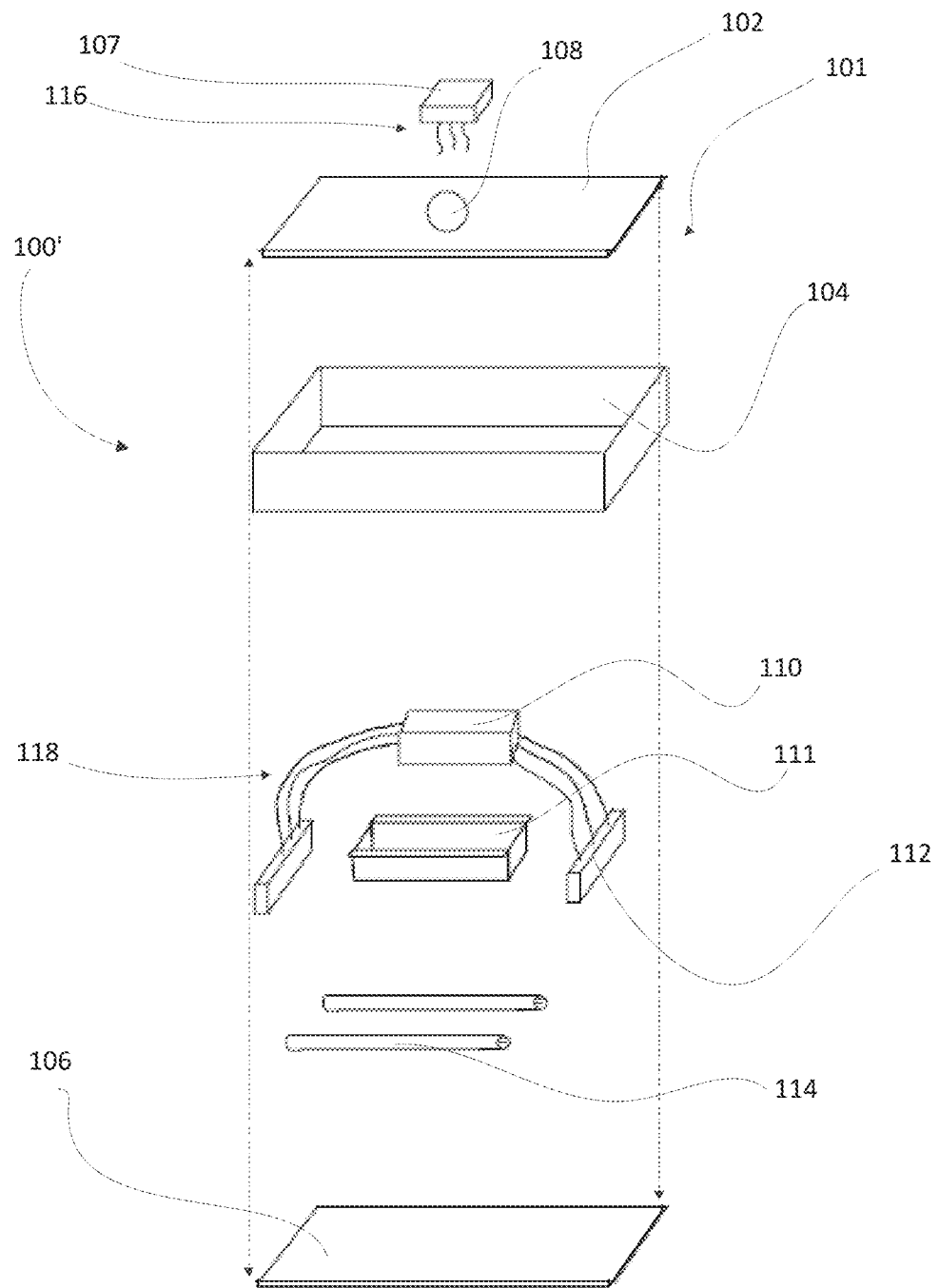
FIG. 10 is an exploded view of another flourescent light fixture with tubes.

As noted, LED bulb adapter 401 has a narrower body than that of LED bulb adapter 201 and its bulb arms 204 extend away from each end of electrical enclosure 402. Thus, LED bulb adapter 401 is well suited for long and narrow fixtures, such as those designed for holding a pair of T12 or T8 fluorescent tubes. FIG. 10 shows an exploded view of an example fixture 100', identical to fixture 100 except that it is sized to hold two, rather than four fluorescent tubes 114.

Figure 11:
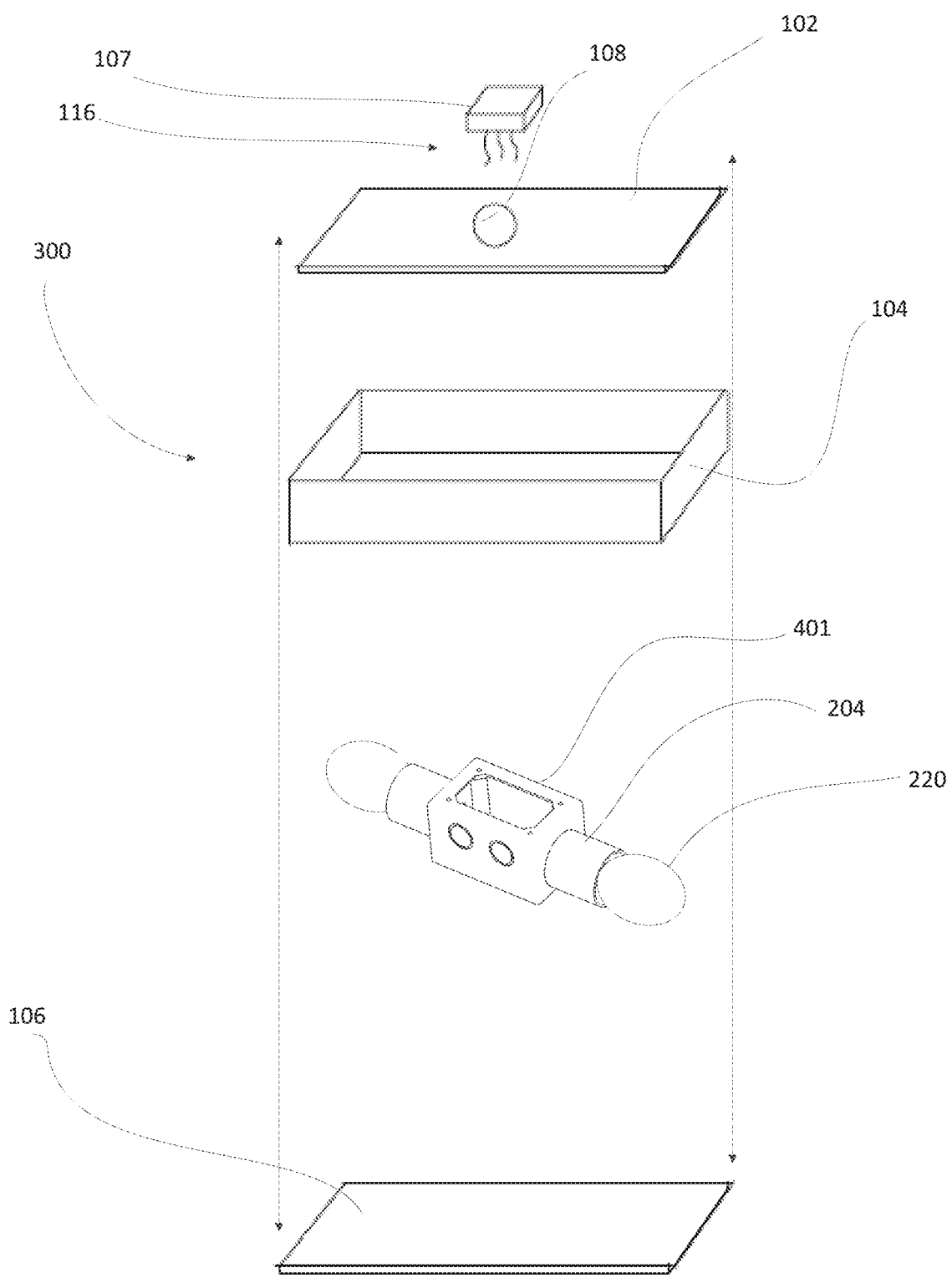
FIG. 11 is an exploded view of a light fixture including the LED bulb adapter of FIG. 6 with bulbs.

FIG. 11 shows an exploded view of a fixture 300, identical to fixture 100', except that LED bulb adapter 401 and bulbs 220 are retrofitted in place of ballast 110, ballast cover 111, tube holders 112 and fluorescent tubes 114. LED bulb adapter 401 holds LED bulbs 220 so that light emitted by LED bulbs 220 is distributed across the fixture housing and lens. That is, LED bulb adapter 401 holds an LED bulb proximate each end of such a fixture. Thus, light is distributed across the fixture housing and reflected toward lens 106, which further scatters light exiting the fixture.

Moreover, the height and generally planar arrangement of LED bulb adapter 401 permits the bulb adapter and associated bulbs 220 to be fully enclosed.

Figure 12:
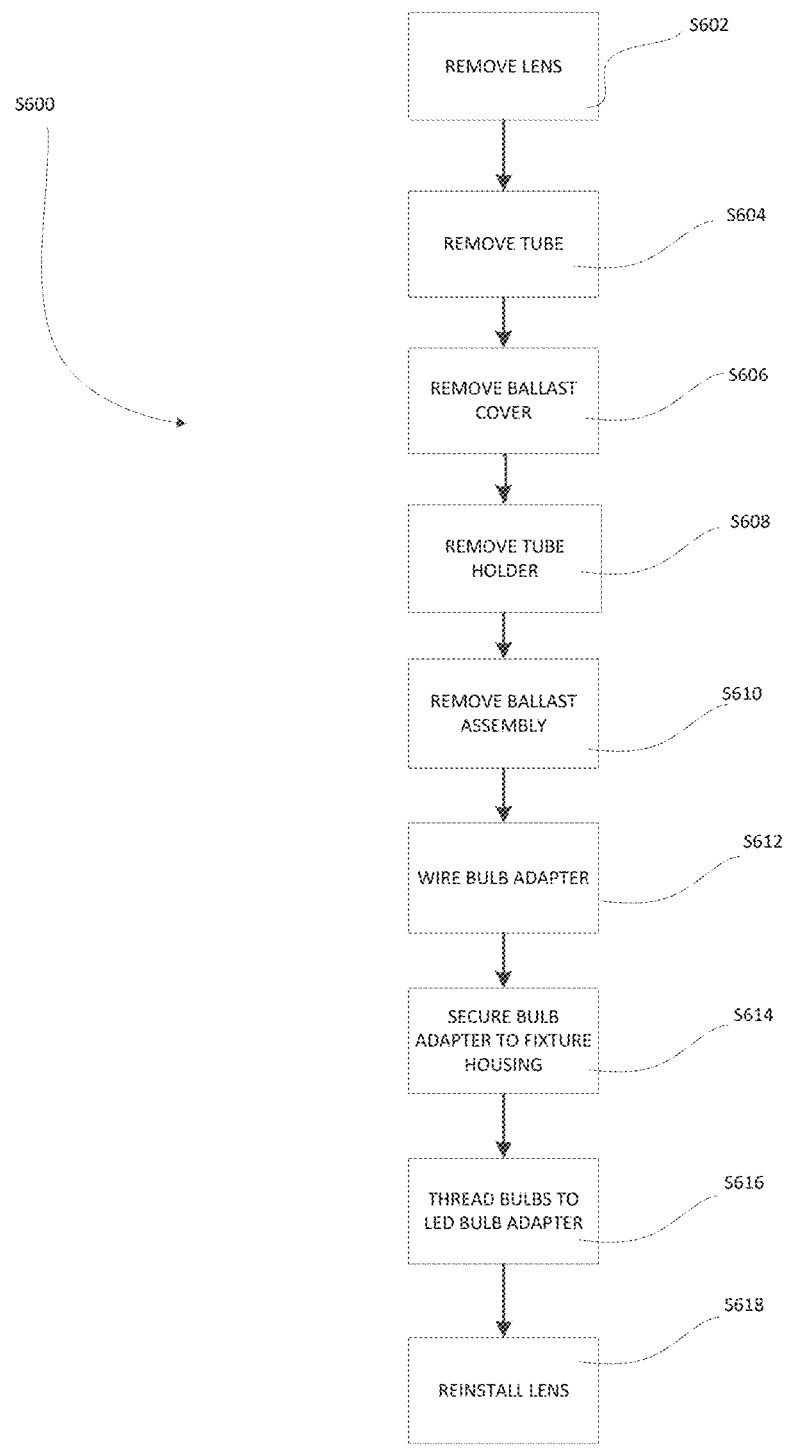
FIG. 12 is a flow chart depicting a method of retrofitting.
Figure 13:
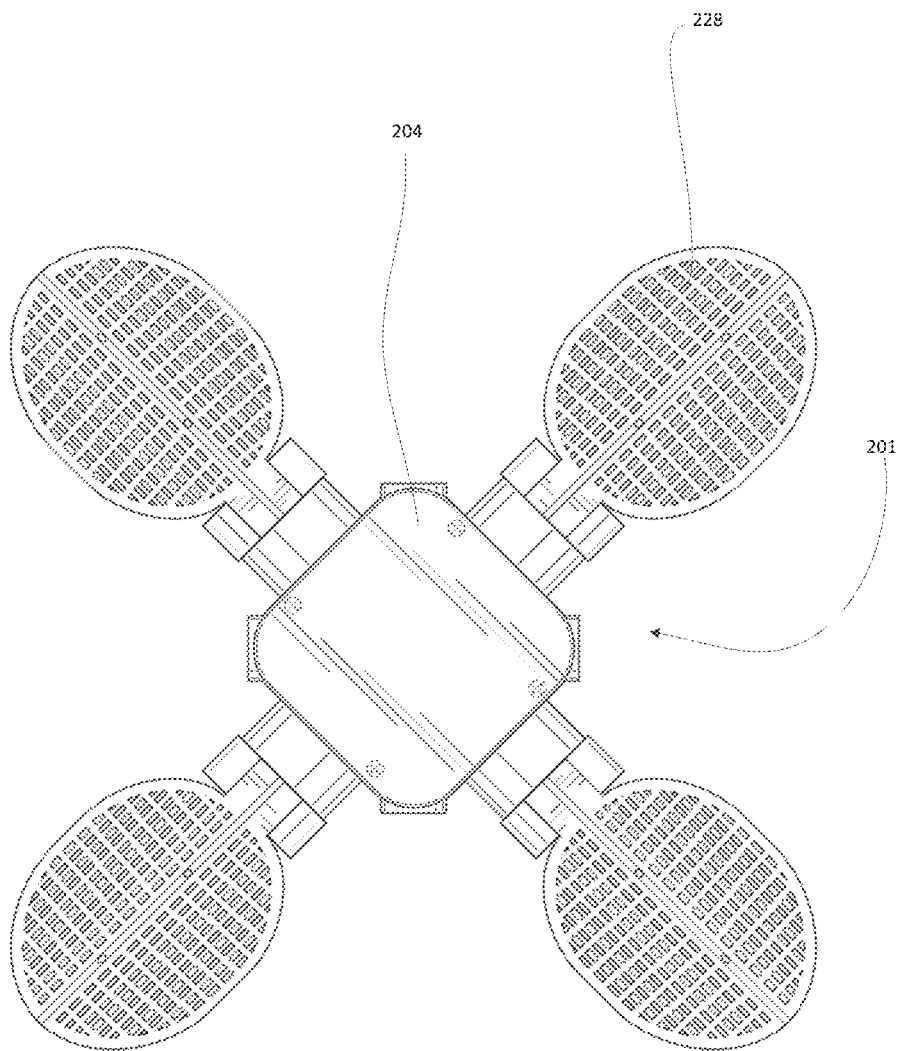
FIG. 13 is a bottom view of an LED bulb adapter with diffusers.

FIG. 12 depicts a method S600 of retrofitting an LED bulb adapter 201, 401 and LED bulbs 220 to a fluorescent light fixture 100, 100'.

At block S602, lens 106 is removed from housing 101. Typically, lens 106 is secured to housing 101 by one or more clips, in which case the clips are disengaged. Alternatively, lens 106 may be slid out of housing 101 or fasteners holding lens 106 to housing 101 may be removed. In some embodiments, lens 106 may be hingedly attached to housing 101 and may hang from housing 101 after removal.

Removal of lens 106 provides access to the interior of housing 101. Accordingly, at block S604, tubes 114 may be removed from tube holders 112. As noted above, tubes 114 may have a pair of contact pins that are received in tube holders 112. Typically, each tube 114 is rotated about its longitudinal axis to release its pins from tube holders 112. Once the pins are released, the tube 114 is lifted from tube holders 112.

Tubes 114 are removed one at a time. Removal of tubes 114 provides access to ballast cover 111.

At block S606, ballast cover 111 is removed. In some embodiments, ballast cover 111 is secured to top plate 102 by clips, which may be released to remove ballast cover 111. Alternatively, ballast cover may be secured to top plate 102 by fasteners such as screws, which may be removed to remove ballast cover 111. Prior to or following removal of ballast cover 111, power to the fixture may be disconnected, e.g. at a circuit breaker.

At block S608, tube holders 112 are removed from top plate 102 by unfastening screws securing the tube holders to the top plate 102. Once the tube holders are unscrewed from top plate 102. Tube holders 112 may hang from ballast output lines 118 which may still connect tube holders 112 to ballast 110.

At block S610, ballast 610 is removed from top late 102 by releasing one or more clips, removing one or more fasteners, sliding ballast 110 out of a retainer, or a combination thereof. Ballast 110, output lines 118 and tube holders 112 are then lifted out of housing 101 as an assembly.

At block S612, mains power supply lines 116 are threaded through top opening 208, 408 and connected to wires 209, 409 to provide power to bulb sockets 222 and thus, to bulbs 220. Connections between mains power supply lines 116 and wires 209, 409 may be made, for example, using wire nuts. In some cases, each mains power supply line 116 may be connected to a corresponding wire 209, 409 of more than one contact assembly 222.

If required by the wiring configuration of the fixture to which LED bulb adapter 201, 401 is being retrofitted, a knock-out panel 210, 410 may be removed and a suitable electrical connector installed in the resulting opening. Mains power supply lines 116 may then be routed through the connector and knock-out to connect with wires 209, 409.

At block S614, LED bulb adapter 201, 401 is fastened to the fixture housing by positioning top opening 218, 418 in alignment with hole 108 and inserting fasteners, e.g. screws, through mounting holes 207, 407.

At block S616, LED bulbs are threaded into bulb sockets 222.

At block S618, lens 106 is reinstalled to fixture housing 101.

Conveniently, the above-described method may be performed without requiring skilled labor, and with a minimum of tools.

Moreover, in some instances, it may be desired to replace LED bulbs 220. For example, bulbs 220 of different types may be swapped, or defective or inoperative bulbs may be replaced with working bulbs. As will be apparent, such replacements may be inexpensive and may be performed manually without any tools, for example, by a building resident or superintendent, without need for an electrician. Conversely, replacing a ballast 110 in a fluorescent fixture such as fixture 100 may be difficult and expensive and may require specialized tools or training.

In some embodiments, one or more diffusers may be mounted to LED bulb adapter 201, 401 to further scatter light produced by LED bulbs 220. FIG. 12 depicts a bottom view of an example LED bulb adapter 201 with a diffuser 228 mounted to each bulb socket 204 to scatter light produced by each respective LED bulb 220.

Figure 14A:
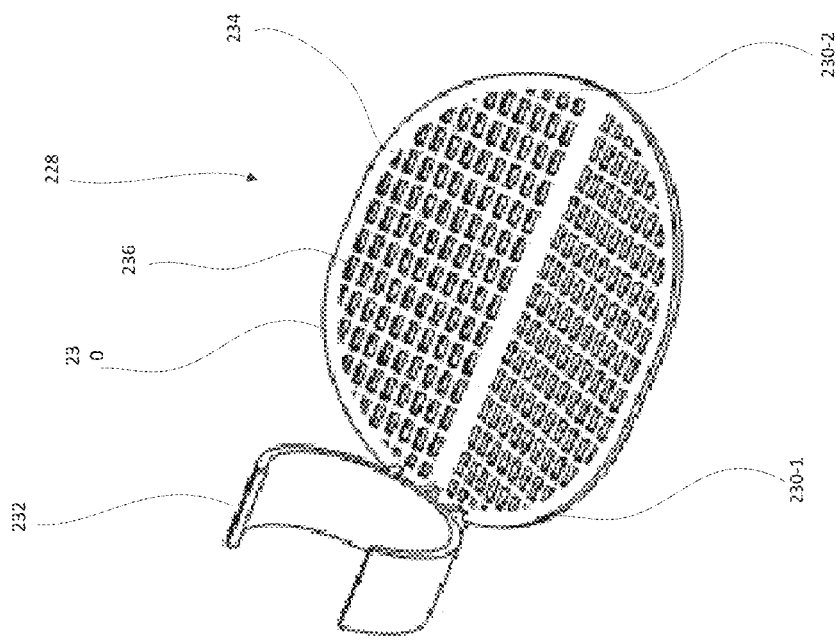
FIGS. 14A-14B are perspective and front views of a diffuser of FIG. 13.
Figure 14B:
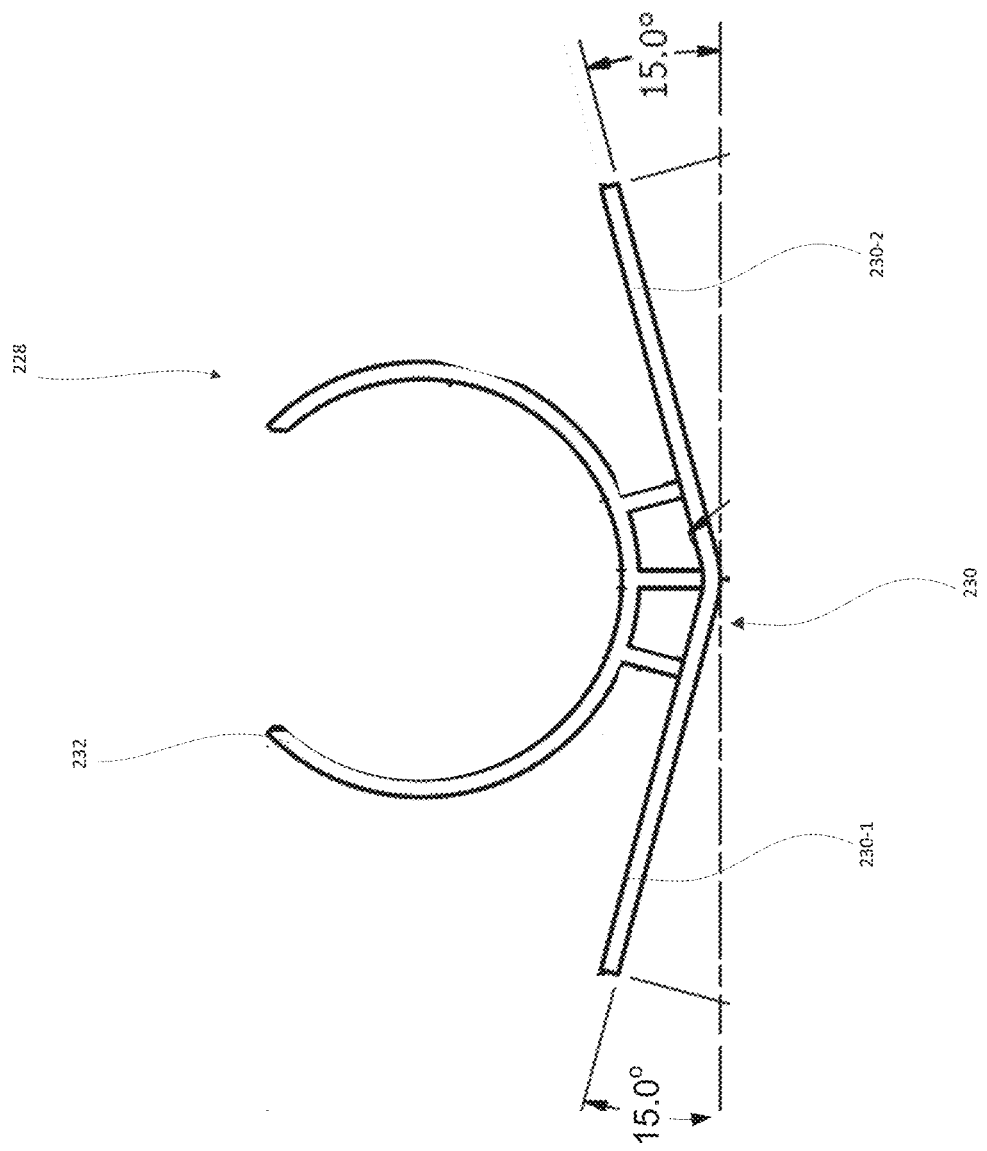

FIGS. 14A-14B depict a diffuser 228 in isometric view and front views, respectively. Diffuser 228 has a baffle portion 230 and a retaining ring 232. Retaining ring 232 is sized to fit tightly over bulb socket 204. Retaining ring 232 is formed of a resiliently deformable material, such as UL 5VA polyvinyl chloride (PVC). Retaining ring 232 may thus be deformed slightly to clip over bulb arm 204, and once clipped over bulb arm 204, retaining ring may tightly grip bulb bulb arm 204 to secure diffuser 228 thereto.

Baffle portion 230 is formed in a lattice pattern, with grating 234 defining a grid of apertures 236. Light produced by LED bulbs 220 may diffract as it passes through apertures 236, causing scattering of the light. In an example, each aperture 236 is approximately 2 mm wide and 5.5 mm long and grating 234 is approximately 2 mm thick.

Baffle portion 230 may have multiple constituent surfaces, either or both of which may be inclined and which may be angled relative to one another. For example, as best shown in FIG. 14B, baffle portion 230 has two surfaces 230-1 and 230-2, each of which is angled at approximately 15 degrees to horizontal, and which are angled at approximately 150 degrees relative to one another. Angling of surfaces 230-1, 230-2 may improve the diffractive effect of diffuser 228.

Grating 236 may have a reflective surface so that light hitting the grating is reflected and further scattered. For example, grating 236 may be formed of a metallic material with a shiny finish, or may be painted or otherwise covered in a white, silver or mirrored coating. Thus, baffle 230 further scatters light produced by LED bulbs 220, such that when installed in a fluorescent fixture, LED bulb adapter 201, 401, LED bulbs 220 and baffles 230 cooperate with the fixture housing and lens to produce a diffuse lighting pattern.

Retaining ring 232 is configured to hold baffle portion 230 at a specific distance from bulb arm 204 (and thus, LED bulb 220) to produce the desired diffractive effect. In an example, retaining ring 232 holds baffle portion 230 at a distance of approximately 10 mm below bulb arm 204.

Moreover, to ensure that diffuser 228 scatters a sufficient portion of the light produced by LED bulb 220, baffle portion 230 may extend a specific distance beyond the end of bulb arm 204. In an example, baffle portion 230 extends approximately 100 mm past bulb arm 204.

Optionally, baffle portion 230 of diffuser 228 may be pivotally mounted to retaining ring 232 to enable selective repositioning of baffle portion 230 relative to bulb are 204 and bulb 220.

In some embodiments, baffle portion 230 or grating 236 may be formed in a specific shape, such that diffuser 228 cases a shadow and lighting pattern of corresponding shape. For example, baffle portion 230 or grating 236 may be formed in the shape of a logo, or to create a specific pattern of light and dark regions.

Figure 15:
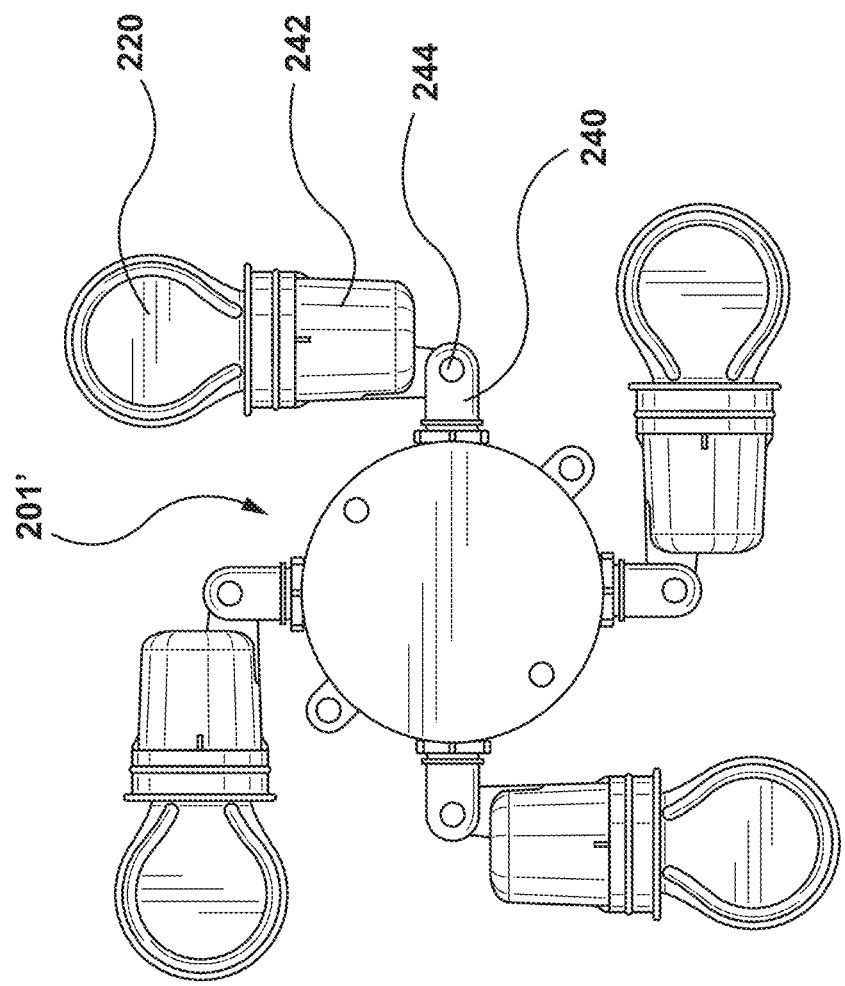
FIG. 15 is a bottom view of another LED bulb adapter with bulbs.

In some embodiments, LED bulb adapters may have hinged bulb arms. For example, FIG. 15 depicts a bottom view of an LED bulb adapter 201' similar to LED bulb adapter 201. LED bulb adapter 201' has four bulb arms 204', each of which has a proximal link 240 and a distal link 242, connected by a hinge 244. LED bulbs 220 are received in each distal link 242. Each distal link 242 can be pivoted about its respective hinge 244 to aim in a desired direction. Thus, LED bulbs 220, and the light they produce may be aimed. For example, LED bulbs 220 may be aimed based on the fixtures to which they are installed to cooperate with the fixture housing and lens to produce a desired lighting pattern.

Figure 20:
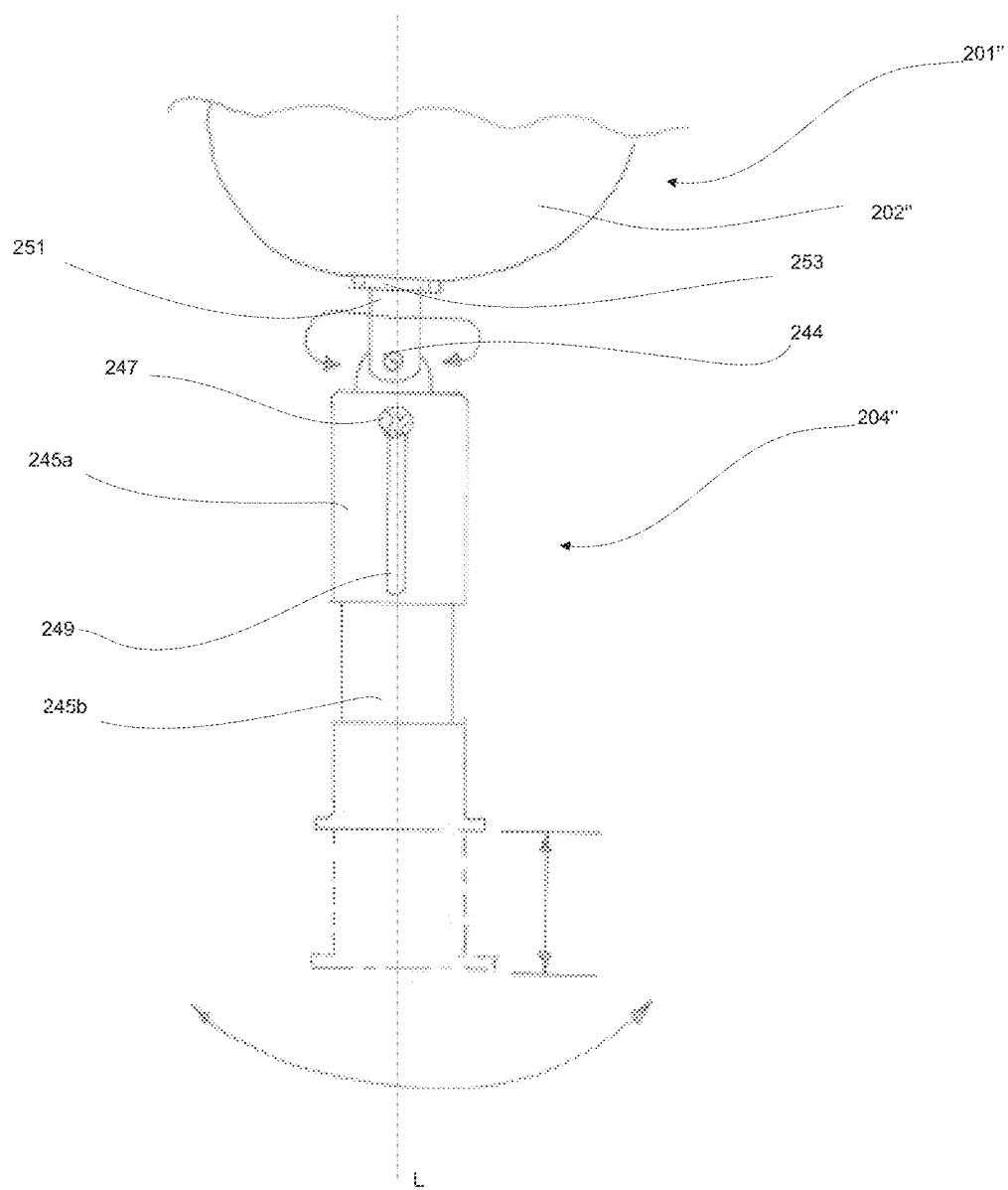
FIG. 20 is a schematic view of a bulb arm of an LED bulb adapter.

In some embodiments, bulb arms may be extendable along or rotatable about a longitudinal axis. For example, FIG. 20 depicts a bulb arm 204" extending from a body 202" of an LED bulb adapter 201". Bulb arm 204" is pivotable about a hinge 244 in a similar manner to bulb arm 204'. In addition, bulb arm has telescoping segments 245a, 245b which allow bulb arm 204" to be extended or retracted along its longitudinal axis L. Telescoping segment 245b is slidably received by telescoping segment 245a. Segments 245a, 245b may be secured relative to one another by a set screw 247 in a guide slot 249.

Moreover, bulb arm 204" is pivotably mounted to body 202" such that the bulb arm 204" can be rotated around its longitudinal axis L. Bulb arm 204" may, for example, be attached to body 202" by a threaded connection, such that the threads can hold bulb arm in a range of possible orientations.

Figure 16:
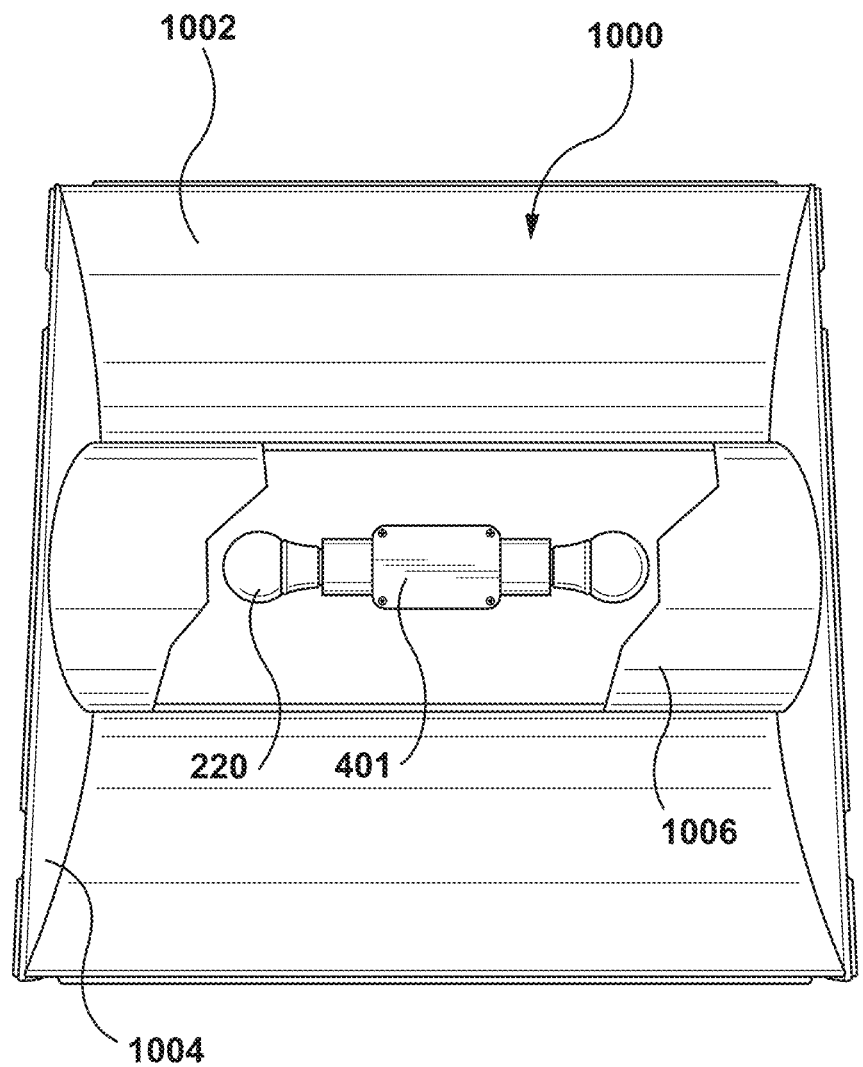
FIG. 16 is a bottom view of a fixture with the LED bulb adapter of FIG. 6 and bulbs.

In some embodiments, rather than being retrofitted to an existing fixture, LED bulb adapters may be provided as part of their own specialized fixtures. FIG. 16 depicts a bottom perspective view, in partial cutaway, of a fixture 1000 with an LED bulb adapter 401 and bulbs 220. Fixture 1000 has an arched top plate 1002 and two opposing end walls 1004. Top plate 1002 and end walls 1004 may be formed of a metallic material such as mild steel and may have reflective inner surfaces. The inner surfaces of top plate 1002 and end walls 1004 may, for example, be painted white or silver, or finished with a mirrored surface.

Fixture 1002 has an arched lens 1006 defining a light enclosure. Lens 1006 may be formed of a translucent plastic or any other suitable translucent or transparent material. Lens 1006 may be selected to cause refraction of light produced by LED bulbs 220 to produce a diffuse lighting pattern. In the depicted embodiment, fixture 1000 is 2 feet wide by 2 feet long. In other embodiments, fixtures 1000 may have the same outer dimensions as common fluorescent lighting fixtures. Accordingly, fixtures 1000 may be usable in place of fluorescent fixtures in standard ceiling designs, such as standard suspended ceiling patterns.

In some embodiments, LED bulb adapters and LED bulbs may be installed in high-bay fixtures. For example, some high-bay fluorescent lighting fixtures may be designed to accommodate one or more ballasts, and a large number of tubes (e.g. 8 or more). Moreover, high-bay fluorescent fixtures may be designed to accommodate relatively high-wattage fluorescent tubes, such as 55W T5 tubes. High-bay fluorescent fixtures may be designed to be powered by relatively high mains voltage, e.g. 347V AC. In such embodiments, multiple LED bulb adapters 201, 401 may be installed in a single fixture.

LED bulb adapters 201, 401 may also be installed to fluorescent strip lighting fixtures designed to accommodate exposed fluorescent tubes, i.e. to receive flourescent tubes without enclosing them behind a lens. In such fixtures, fluorescent tube holders may be mounted directly to a ballast cover. LED bulb adapters 201, 401 may be retrofitted to such fixtures by removing the tube holders, removing the ballast cover and ballast, wiring an LED bulb adapter 201, 401 and attaching it to the ballast cover, and re-attaching the ballast cover to the fixture.

Figure 17:
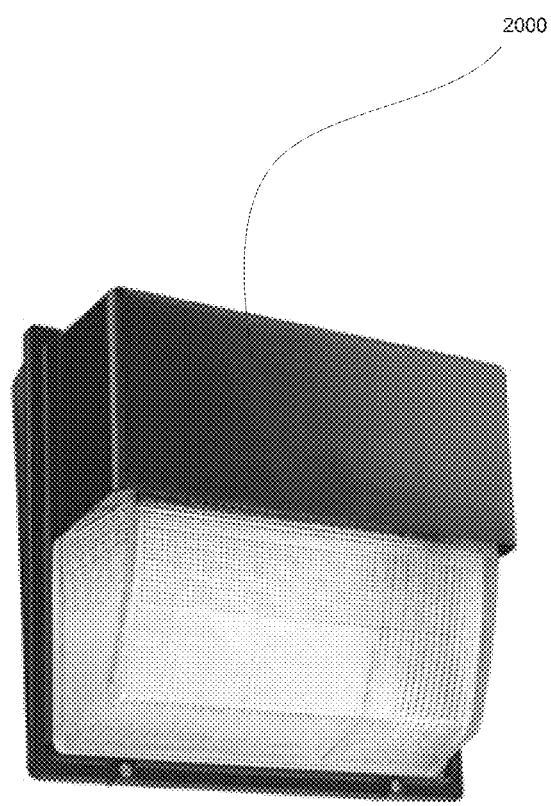
FIG. 17 is a perspective view of an example high-pressure sodium wall pack fixture.

In still other embodiments, LED bulb adapters may be installed in high-pressure sodium lamp fixtures. For example, FIG. 17 shows a typical high-pressure wall pack fixture 2000. As will be apparent, wall pack fixture 2000 is much shorter than fluorescent tube fixture 100.

Figure 18:
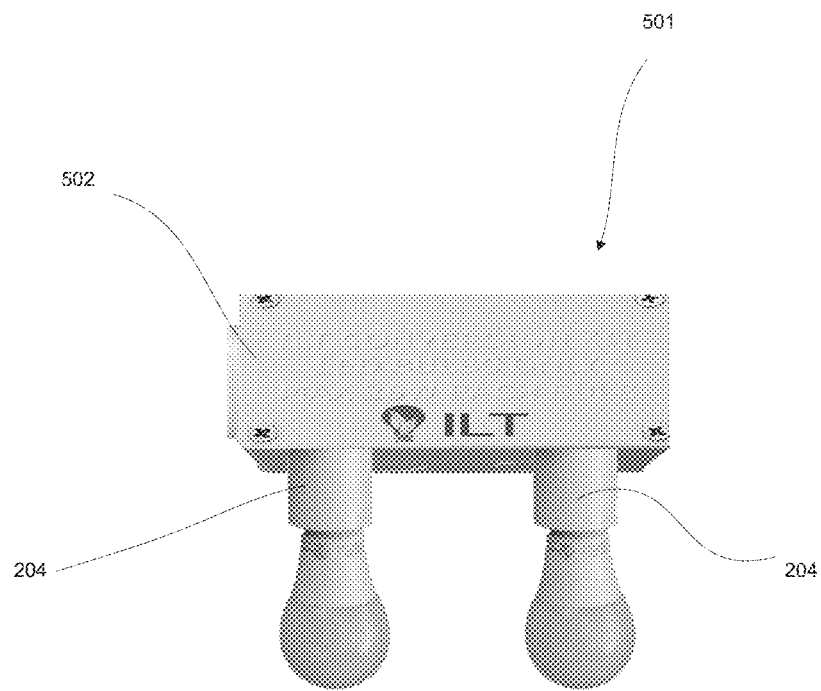
FIG. 18 is a perspective view of a bulb adapter for installation to the wall pack fixture of FIG. 17.

FIG. 18 shows an example LED bulb adapter 501 configured for installation to wall pack fixture 2000. LED bulb adapter 501 is similar to LED bulb adapter 401 except that LED bulb adapter 501 has multiple bulb arms 204 extending from a single side of its body 502, rather than from opposite ends.

Figure 19:
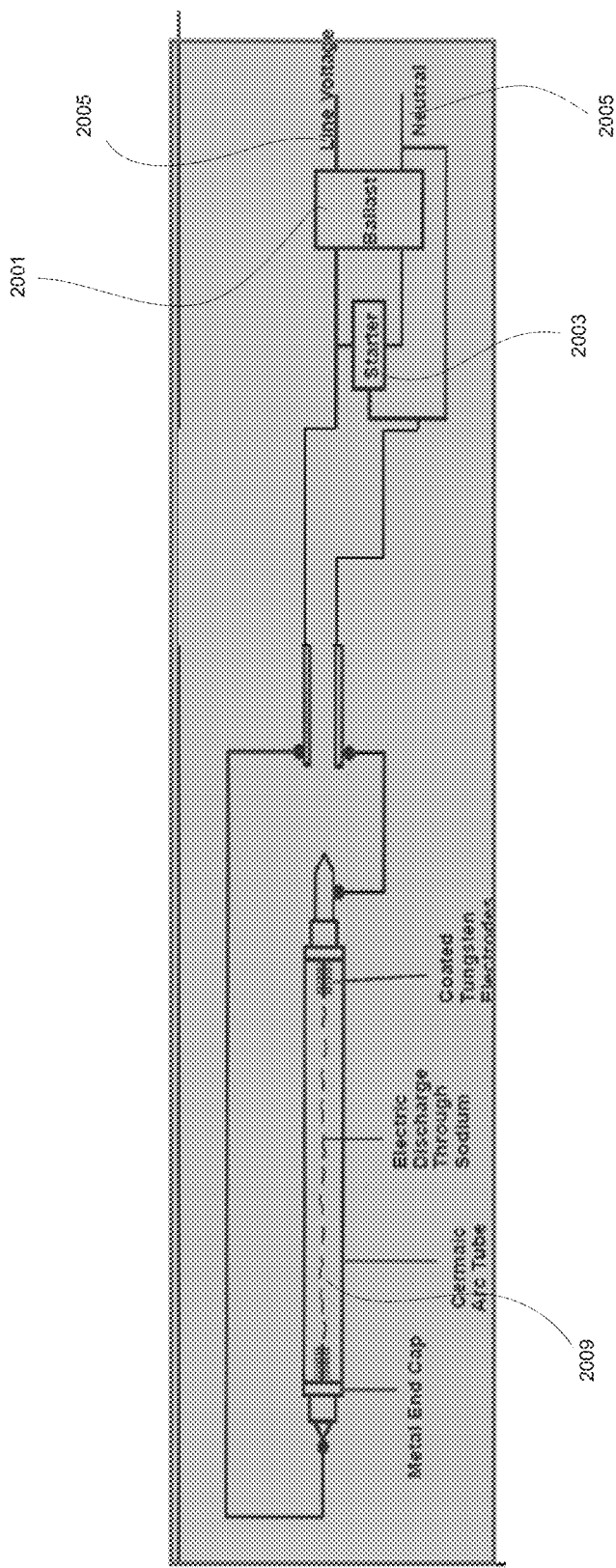
FIG. 19 is a schematic view of an example high pressure sodium lamp circuit.

FIG. 19 shows a schematic diagram of an electrical configuration of a typical high-pressure sodium wall pack fixture, with a high-pressure sodium lamp 2009 driven by a ballast 2001 and starter 2003 connected to and mains supply lines 2005. To retrofit LED bulb adapter 501, ballast 2001, starter 2003 and high-pressure sodium lamp 2009 are disconnected or disconnected and physically removed. Wires of LED bulb adapter 501 are connected to mains supply lines 2005.

In addition to wall-pack high-pressure sodium fixtures, LED bulb adapters may be configured for installation to high-bay high pressure sodium fixtures. Such fixtures may be designed for mounting in a high elevated location above an area to be illuminated. For example, high-bay fixtures may be mounted at an elevation above a warehouse floor. High-bay fixtures designed for high-pressure sodium bulbs may have, for example downwardly-opening dome, frusto-conical or bell shapes and may include a ballast and starter as depicted in FIG. 19. LED bulb adapters designed for such fixtures may have bulb arms that extend downwardly and outwardly to match the shape of the fixture.

In other embodiments, LED bulb adapters may be installed to other types of lighting fixtures, such as signage fixtures, pole lamps, and the like.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The invention is defined by the appended claims.

What is claimed is:

1. A method of retrofitting a fluorescent tube light fixture with an LED bulb adapter the fluorescent tube fixture originally having a ballast, a fluorescent tube receptacle for receiving pins of a fluorescent tube, and an enclosure defined by a reflector housing and a lens, the method comprising:
    removing said lens from said reflector housing;
    disconnecting said ballast from a mains power supply line and removing said ballast and said fluorescent tube receptacle from said housing to expose a mains power supply line entry point in the reflector housing;
    providing a LED bulb adapter comprising a body defining an electrical enclosure, the body having a mounting flange defining a central opening to receive said mains power supply line, the body having a plurality of bulb arms extending from the body, each bulb arm mounting an Edison socket light-emitting diode (LED) bulb socket;
    wiring said mains power supply line to the plurality of Edison socket light-emitting diode (LED) bulb sockets extending from the body of the LED bulb adapter, defining an electrical junction box, said bulb sockets configured to distribute light from said LED bulbs across said lens and said reflector;
    securing the mounting flange on a surface of the reflector housing;
    threading a plurality of LED bulbs into said bulb sockets;
    installing said lens to said housing such that said LED bulb adapter is received in an enclosure defined by said housing and said lens.

2. The method of claim 1, wherein said wiring comprises removing a knock-out panel on said body of the LED bulb adapter and threading a wire through said knock-out panel.

3. The method of claim 1, further comprising attaching said mounting flange to said surface of the reflector housing using self-tapping fasteners.

4. The method of claim 1, comprising attaching a diffuser grate to at least one bulb arm.

5. The method of claim 1, wherein said body defining an electrical junction box is mounted inside said housing, opposing another electrical junction box outside said housing.

6. The method of claim 1, wherein the mounting flange abuts the surface of the reflective housing to position the central opening in alignment with said mains power supply line entry point.

7. A bulb adapter for retrofitting a fluorescent tube light fixture with an LED bulb adapter the fluorescent tube fixture originally having a ballast, a fluorescent tube receptacle for receiving pins of a florescent tube, and an enclosure defined by a reflective housing and a lens, said LED bulb adapter comprising:
    a body defining an electrical junction box;
    a plurality of bulb arms extending in different directions from said body, each bulb arm mounting an LED bulb socket to hold LED bulbs in a generally planar arrangement inside said enclosure;
    a mounting flange defining an central opening in said body for receiving a mains power supply line to connect said mains power supply line to said LED bulb sockets, said mounting flange for securing said body on a surface of said reflector housing so that said LED bulbs distribute light across said reflective housing and said lens, wherein said central opening is configured to provide clearance such that said body and mains power supply line need not be aligned, wherein said surface comprises a mains power supply line entry point.

8. The bulb adapter of claim 7, wherein said body comprises at least one knock-out panel removable from said body by manual application of pressure to define a wiring pass-through.

9. The bulb adapter of claim 7, wherein said body is formed from a polymer.

10. The bulb adapter of claim 9, wherein said body is formed from polyvinyl chloride (PVC).

11. The bulb adapter of claim 7, comprising a first pair of bulb arms each mounting an LED bulb socket extending from said body on opposite sides.

12. The bulb adapter of claim 11, comprising a second pair of bulb arms each mounting an LED bulb socket extending from said body on opposite sides, wherein said first pair of bulb arms and said second pair of bulb arms are generally perpendicular to one another.

13. The bulb adapter of claim 7, wherein said bulb sockets are sockets for receiving an LED bulb with a standard medium size threaded base.

14. The bulb adapter of claim 7, comprising a light diffuser mounted to at least one of said bulb arms.

15. The bulb adapter of claim 14, wherein said light diffuser defines a lattice pattern and has a reflective surface.

16. The bulb adapter of claim 14, wherein said light diffuser is releasably attached to said bulb socket with a clip.

17. The bulb adapter of claim 14, wherein said light diffuser has a plurality of inclined diffractive surfaces at an angle to one another.

18. A light fixture comprising the adapter of claim 7, mounted within an enclosure defined by a reflector housing and a lens.

19. The bulb adapter of claim 18, wherein said body defining an electrical junction box is mounted inside said housing, opposing another electrical junction box outside said housing.

20. The bulb adapter of claim 7, wherein said central opening is configured to abut the surface of the reflective housing to position the central opening in alignment with said mains power supply line entry point.

* * * * *